United States Patent Office 3,316,217
Patented Apr. 25, 1967

3,316,217
POLYACETALS AND A PROCESS OF
PREPARING THEM
Klaüs Weissermel and Klaüs Küllmar, Frankfurt am Main, Manfred Reiher, Hofheim, Taunus, and Edgar Fischer, Frankfurt am Main, Germany, assignors to Farbwerke Hoechst Aktiengesellschaft vormals Meister Lucius & Bruning, Frankfurt am Main, Germany, a corporation of Germany
No Drawing. Filed Dec. 21, 1959, Ser. No. 860,739
Claims priority, application Germany, Dec. 23, 1958, F 27,341; Jan. 27, 1959, F 27,580
10 Claims. (Cl. 260—67)

The present invention relates to polyacetals and to a process of preparing them; more particularly it relates to a process of preparing linear polyacetals of high molecular weight and corresponding to the general formula $$HO[CH_2OCH_2OCH_2O]_nH$$

which process comprises polymerizing in block polymerization trioxane (1:3:5-trioxa-cyclohexane) in the presence of a catalyst having a cationic action and in the absence or nearly entire absence of a solvent.

It is already known that trioxane, i.e., the cyclic trimer of formaldehyde, very readily depolymerizes in the presence of an acid catalyst to form formaldehyde which, in the absence of formaldehyde acceptors, partially polymerizes to form polyformaldehyde (polyoxy-methylene). Moreover, it is known that during repeated sublimation of the monomer there are formed polymers of trioxane, small amounts of which are also present in industrially pure trioxane (presumably formed by a spontaneous polymerization).

The polymers thus formed which are obtained as by-products in the afore-described process in varying quantities and qualities cannot be used for a thermoplastic processing, because they are not sufficiently thermostable and, in most cases have too low a molecular weight. Even after the stabilization with suitable stabilizers they embrittle owing to their unfavorable molecular weight composition; thus, they are unsuitable for further processing.

Furthermore, it is known that trioxane preferably polymerizes at a temperature of about 125° C. in the absence of a solvent and in the presence of special inorganic fluorides, particularly in the presence of antimony-trifluoride, to form a polyacetal. Said process has, however, the draw-back that the resulting polymer is nonuniform in molecular weight and also thermo-unstable; it requires prolonged polymerization periods and, under the polymerization conditions described it can hardly be controlled from an industrial point of view. Moreover, it does not melt down homogeneously, discolorizes and is different, as regards its dissolving power, from the polyacetals obtained from trioxane by the process of the invention. Contrary to the polyacetals, it does not form a clear solution when dissolved in butyrolactone or dimethylformamide.

Hence results that none of the hitherto known processes is suitable for the polymerization of trioxane, so as to obtain polymers which can satisfactorily be used for the thermoplastic processing to form foils, films, threads, tubes, molded articles or the like.

Now, we have found a simple process for the preparation of linear polyacetals of high molecular weight, which melt at a temperature within the range of 160 and 180° C. in a homogeneous manner, which are completely soluble in butyrolactone and which, owing to their excellent thermostability and their favorable molecular weight distribution, can satisfactorily be processed by the usual methods applied in the manufacture of plastic materials.

The process of the invention is characterized in that cyclic acetals, advantageously trioxane, are discontinuously or continuously polymerized by the mass polymerization process in the presence of a catalyst of cationic action.

Under the polymerization conditions applied, the mass polymerization of trioxane, in the presence of minimum quantities of a catalyst of cationic action, results in the formation of a thermostable, linear polyacetal of high molecular weight showing reduced viscosity values within the range of 0.3 and 3, advantageously within the range of 0.5 and 2.0, determined in a 0.5% solution in butyrolactone at a temperature of 140° C. in the presence of 2% of diphenylamine.

The mass polymerization of trioxane by the process of the invention takes an extremely rapid course, showing high yields.

As further advantages there may be mentioned an excellent yield per unit of volume and time, the saving of highly purified solvents, the easy purification of the monomer, the small polymerization equipment required and the relatively simple polymerization method.

For the polymerization of trioxane by the mass polymerization process of the present invention there may be used as catalysts, in general, compounds which are known to cause the cationic polymerization.

As catalysts having a cationic action there may be named the compounds which are capable of taking up one or several pairs of electrons in an open outer shell of one of their atoms. Consequently, there may be used compounds which may be regarded as electron acceptors or as Lewis acids, respectively (cf. Kortüm, Lehrbuch der Elektrochemie, Wiesbaden, 1948, pages 300–301).

Among the large number of inorganic compounds known as Lewis acids and active as polymerization catalysts, there may be named, for example:

$BF_3$, $BCl_3$, $AlCl_3$, $FeCl_3$, $SbCl_3$, $SbCl_5$, $ZnCl_2$, $SnCl_4$, $TiCl_4$

Compounds of the general formula $$RMeX_{n-1}$$

in which R represents an alkyl group having preferably 1–5 carbon atoms, Me represents an element of the third and fourth main group of the Periodic Table by Mendelyeev, X represents halogen, preferably F or Cl, and $n$ is the valency of the element can also be used as active catalysts. In general, they are used in a concentration of 0.1 to 1% by weight, calculated on the weight of the monomer applied. As examples, there may be named:

$CH_3AlCl_2$, $C_2H_5AlCl_2$, $CH_3BCl_2$, $CH_3BF_2$, $CH_3SnCl_3$, $C_2H_5SnCl_3$ and finally combinations of 0.01 to 1%, calculated on the weight of the monomer applied, of organometallic compounds with 0.01 to 5%, calculated on the weight of the monomer applied, of aliphatic and/or cycloaliphatic alpha-halogen-ethers of the general formula

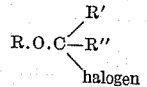

in which R represent a saturated straight-chain or branched alkyl radical or a cycloalkyl radical, R' and R" represent a hydrogen atom or a saturated straight chain or branched alkyl radical or cycloalkyl radical, R' and R" representing equal or different radicals. For example, there may be named the following alpha-halogen-ethers:

$CH_3.O.CH_2.Cl$, $C_2H_5.O.CH_2Cl$

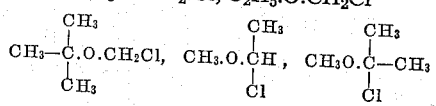

Cyclohexyl.O$CH_2Cl$

Suitable combinations are, for example

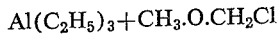

or

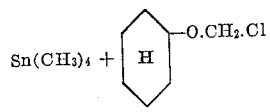

The aforenamed inorganic or organometallic catalysts may be used as such or as mixtures, if necessary in combination with co-catalysts yielding protons and/or carbenium ions, such as water, tertiary butanol, acetic acid, trichloro-acetic acid, halogenated acetic acids, benzyl chloride, benzyl-bromide, benzotrichloride, benzoyl chloride and acetyl chloride.

Sometimes, the dosage of the catalysts requires special precautions, since substantially all the enumerated polymerization catalysts of cationic action instaneously initiate the polymerization under the polymerization conditions applied. A dilution of the catalysts, especially of the readily volatile metal-or nonmetal-halide catalysts with an inert agent, particularly with a gas, such as a noble gas, nitrogen, trifluormethane or the like is, therefore, often advantageous in order to uniformly distribute the catalyst in the polymerization medium.

In the further development of the process of the invention for the manufacture of polyacetals we have found that it is of particular advantage to use complex compounds of Lewis acids for the polymerization herein described. There may be named, as examples, the known addition compounds of the catalysts, termed as Lewis acids, on organic ethers, thio-ethers, esters, amines carboxylic acid amides and carboxylic anhydrides. As complex-or molecular compounds of said kind there come into consideration, for example:

An addition compound of boron-trifluoride and dimethyl ether,
An addition compound of boron-trifluoride and methyl-ethyl-ether,
An addition compound of boron-trifluoride and diethyl-ether,
An addition compound of boron-trifluoride and di-iso-amyl-ether,
An addition compound of boron-trifluoride-tetrahydro-furane,
An addition compound of boron-trifluoride-tetrahydro-pyrane,
An addition compound of boron-trifluoride and diethyl-thioether, the molecular compounds from $BF_3$ with aliphatic carboxylic acid esters such as formic acid methyl ester and acetic acid methyl-ester, the complex compounds of $BF_3$ with carboxylic anhydrides, such as chloracetic anhydride or phenylacetic anhydride, the nitrogeneous complex compounds of $BF_3$ with diphenylamine, acetonitrile, and also with mono- or dicarboxylic acid amides.

There may also be mentioned the analogous complex compounds or molecular compounds of further Lewis acids (not enumerated herein in detail) with compounds which must be regarded as electron donors.

These complex compounds can easily be prepared by known methods and represent well defined liquids or well crystallizing compounds.

The reactivity of the complex compounds varies very much and depends to a high degree on the acidity of the electronic acceptor, i.e. the Lewis acid, and on the basicity of the electron donors, i.e. the basicity of the Lewis base.

By an appropriate combination of the acid-base-couple there can be adjusted various stages of activity. Thus, for example, the amine-$BF_3$-complex compounds are less effective for the polymerization of trioxane than the $BF_3$-tetrahydrofurane or tetrahydropyrane complex compounds.

For the polymerization of acetal, and more particularly of trioxane, there may be used with best success, according to the process of the invention, addition compounds of Lewis acids, preferably of $BF_3$, on polyacetals. Block-polymers of trioxane are advantageously used as polyacetals.

These complex compounds are of special interest insofar as the Lewis base corresponds to a large extent to the polymer formed from trioxane; thus, they represent an excellent carrier for Lewis acids, and more particularly for $BF_3$. As regards the reactivity, the polyacetal-$BF_3$-addition compounds are, moreover, superior to the $BF_3$-ether or thioether- or amine-complex compounds and they allow a simple dosage, from a technical point of view, in a wide $BF_3$-polyacetal range.

The complex compounds of Lewis acids may be used as such or in admixture for the polymerization of trioxane.

We have furthermore found that Lewis acids in the form of their ionic compounds, advantageously the oxonium salts and diazonium salts of $BF_3$, $SbCl_5$, $FeCl_3$, $SnCl_4$, $PF_5$ and others are likewise useful catalysts for the block polymerization of trioxane according to the process of the invention.

Highly active and industrially of great importance have been found aryl-diazonium salts which are easily accessible by classic synthetic methods and can be modified to a large extent. The special advantage of this class of catalysts furthermore consists in that they are readily soluble in the monomer to be polymerized and that their catalytic activity evolves only after the decomposition of the aryl-diazonium salt, preferably after the decomposition of the aryl-diazonium-fluoroborate.

The decomposition of the aryl-diazonium salts is different in each individual case and influenced by the different structure that the salts have. It has also been found that there exist aryl-diazonium salts, and advantageously aryl-diazonium boron fluorates, which thermally decompose under the polymerization conditions of the process of the invention; others, however, decompose under the same polymerization conditions only in the presence of light, for example in the presence of normal sunlight or the light of a mercury lamp, and then initiate the polymerization. The required or preferred source of light depends, in general, on the spectral sensibility of the aryl-diazonium fluoborate applied.

Thus, we distinguished thermo-active and light-active aryl-diazonium salts which are suitable with particular advantage for the polymerization of acetals.

The salts of Lewis acids may be used as such or in admixture or diluted with a substance, for example with polymers or monomers.

The following ionic compounds of Lewis acids may, for example, particularly be named:

(a) oxonium salts: Trimethyl-, triethyl-, tri-n-propyl-oxonium fluoroborate methyl-tetramethylene-oxonium-fluoroborate, ethyl-tetramethylene-oxonium-fluoroborate, methyl- or ethyl-pentamethylene-oxonium-fluoroborate, the oxonium salts of dimethylpyrone, cumarine and camphor, furthermore the oxonium salts of analogous construction or inner oxonium salts of iron, antimony, or tin such as trialkyl-oxonium-tetrachloro-ferriate, trialkyl-oxonium - hexachloro - antimonate, bis - trialkyl-oxonium-hexachloro-stannate and others.

(b) diazonium salts: (α) light-active diazonium salts

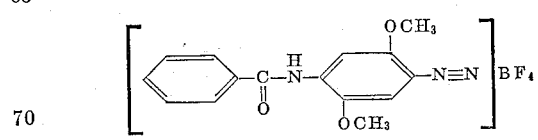

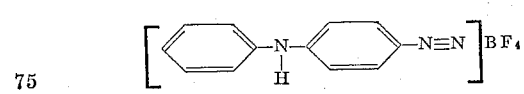

(β) thermo-active diazonium salts which can simultaneously be activated by light the radical —COOCH₃ standing in ortho, meta or para-position the —NO₂-group standing in ortho, meta or para-position X representing halogen, preferably F or Cl in ortho, meta or para-position.

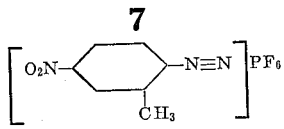

The aforementioned aryl-diazonium salts do not constitute a preferred number of salts, they merely serve for comprehending this highly active class of compounds useful as catalysts. It becomes evident by the afore-made enumeration that diazonium salts of Lewis acids, which are readily accessible by diazotation according to known methods of aromatic or heterocyclic bases or by diazotation of aromatic or heterocyclic bases carrying one or several substituents, are suitable with good success as catalysts for the polymerization of cyclic acetals, and preferably as catalysts for the polymerization of trioxane by the process of the invention. Solubility and decomposability of the aryldiazonium salts under the polymerization conditions applied are determined to a large extent by the structure, kind and number of substituents.

The activity of the diazonium salts may be impaired by substituents at the aromatic system which act as electron donors, for example amino-groups.

The polymerization of trioxane by the block polymerization process may be carried out already with traces of the afore-named catalysts having a cationic action. If a higher concentration is applied, for example about 0.0001 to about 0.1, preferably 0.001 to 0.05 mol percent, calculated upon 1 gram molecule of monomer, advantageously trioxane, the polymerization takes place with an industrially useful velocity. The concentration of the catalyst required for a profound transformation of the monomer into the polymer depends on the activity of the catalyst, the purity of the monomer and the polymerization conditions applied. The speed of polymerization increases pari passu with the increase of the concentration of the catalyst. By the choice of the experimental conditions it may be directed in such a manner that the polymerization heat being set free thereby, serves for maintaining a uniform polymerization temperature and can thus be easily dissipated. The trioxane used for the preparation of linear polyacetals of high molecular weight must be free from impurities such as water, methanol, formic acid, formaldehyde, since these impurities inhibit the course of the polymerization or render it incontrollable.

Trioxane is advantageously purified by fractional distillation with exclusion of moisture and air, or by crystallization from methylene chloride or petroleum ether.

The polymerization of the pure trioxane by the process of the invention in the presence of a catalyst having a cationic action takes place at a temperature ranging between about 0° C. and about 150° C., preferably between 50 and 90° C. The polymerization heat is considerably inferior to that set free during the polymerization of olefin, ethylene oxide or formaldehyde.

The polymerization may be carried out in various ways. The continuous polymerization may, for example, take place on a rotary table. The molten or partially molten trioxane together with the catalyst or the mixture of catalysts is charged to the rotary table and the polymer is discharged after the table has rotated about 300 to 340°.

The continuous polymerization may also take place in a revolving drum; in this case part of the polymer is first introduced whereupon the molten trioxane is added together with the catalyst or separately. There is thus obtained an incompact, fine-grained polymer. It is also possible first to mix the trioxane with the catalyst and then to bring the mixture to the desired polymerization temperature. This proceeding is, however, only possible if it takes place in the presence of aryl-diazonium-fluoroborate, i.e. in the presence of compounds which must be regarded as potential ionic catalysts. Moreover, it is possible to polymerize discontinuously or continuously in plastic containers, for example in containers made of polyethylene. According to the polymerization conditions applied, the polymer is obtained as a solid block or in the form of a powder. Those skilled in the art will recognize further possibilities for performing the polymerization without going beyond the scope of the process of the invention. The polymerization of trioxane by the block-polymerization process, in general, sets in very rapidly after the catalyst or the mixture of catalysts has been added. In the course of the polymerization which sometimes is complete already after some minutes, at the latest, however, after some hours, a crystalline, white polymer is obtained which is substantially insoluble in the molten monomer. The polymerization thus apparently resembles the block polymerization of vinyl chloride, acrylonitrile or trifluorochlorethylene. In some forms of proceeding, it has been found to be favorable if the polymerization of trioxane is carried out in a thickness of the layer of <10 cm., advantageously <5 cm.

It is possible to add to the polymerization batch certain portions of pure inert solvents in which the trioxane is soluble. For this purpose there may be used such solvents whose boiling points are above 60° C., for example, aromatic hydrocarbons such as benzene, toluene, cycloaliphatic hydrocarbons such as cyclohexane, aliphatic hydrocarbons such as hexane, heptane, iso-octane, or substituted hydrocarbons such as $CCl_4$, nitro-ethane or mixtures of the afore-mentioned hydrocarbons.

The solvent must, however, be added in such relatively small proportions that the character of the mass-polymerization is maintained, i.e. the final product must constitute neither a suspension nor a solution.

Fillers, for example, quartz powder or $TiO_2$, or substances capable of controlling the polymerization, influencing the properties of the final products, having a stabilizing or softening action or serving for the insertion of terminal groups into the polymer may also be added to the polymerization batch.

The polymer obtained, according to the method of carrying out the polymerization, in the form of a block, a rope, a band or in the form of an incompact powder is advantageously first comminuted to the desired granular size before being further processed, and then worked up. The processing in the wet state serves to remove the constituents of catalyst and monomer. For this purpose there may be used, for example, a low molecular weight alcohol such as methanol to which has been added a small proportion, for example about 0.1 to 3% by weight, calculated upon the weight of the alcohol used, of ethanolamine, or water admixed with a quantity of ammonia equivalent to the quantity of ethanolamine for example 0.1% by weight. The polymer is boiled in these solvents, then filtered off and washed for a short time. When high yields are attained, advantageously a yield of >90 percent by weight, the crude block polymer may be used directly for the stabilization of the terminal groups, acetic anhydride being advantageously used for this purpose at a temperature ranging between 150 and 160° C. The polymer is dried preferably under reduced pressure at a temperature in the range between 50 and 80° C., while being at rest or moved in suitable driers, for example a drying closet, a tumbling drier, a revolving tube or the like. During drying under normal pressure, for example, in a fluidized bed drier, there is recommended a superposition with nitrogen or another inert gas since the polymer can disintegrate under the drying conditions in the presence of air or oxygen.

The polyacetals obtained by the process of the invention may be stabilized prior to being processed.

In order to stabilize the terminal groups, i.e. to block the terminal hydroxyl groups, it is suitable, as has already been mentioned, to esterify the polyacetal by means of acetic anhydride in the presence of an alkali metal acetate or an organic base at a temperature within the range of about 150 and 160° C. Furthermore, an etherification of the polyacetal in the presence of an appropriate alkylation agent may be useful.

For the thermo-stabilization there may be used such compounds as are capable of binding in a suitable manner the formaldehyde or its secondary products, for example formic acid, which are formed during the thermal decomposition; for this purpose there may be used, for example, derivatives of urea, hydrazine and derivatives of amine.

It is also possible to add to the polyacetal known oxidation- and light-stabilizers, for example, phenols, i.e. compounds which, to a large extent, prevent autoxidation.

The stabilizer or stabilizers are added to the polymer or to the derivatives obtained therefrom by etherification or esterification in an order of magnitude within the range of 0.01 and 10% by weight, advantageously between 0.1 and 5% by weight, calculated on the polymer or the derivatives thereof; they are added during the processing operation or are subsequently worked, by known methods, into the dried or into the molten polymer.

The activity of the stabilizer is often increased by first dissolving the polymer in a suitable solvent, for example dimethyl-formamide or butyrolactone, then adding a solution of the stabilizer or stabilizers in the same solvent, and finally reprecipitating the polymer.

The polymers prepared from trioxane by the aforedescribed mass polymerization process of the invention are linear polyacetals of high molecular weight and correspond to the general formula $$HO[CH_2OCH_2OCH_2-O]_nH$$

in which $n$ is an integer within the range of 100 and 10,000, and advantageously 100 and 1000. The polyacetals thus obtained are soluble in butyrolacetone at a temperature of 140° C., they melt within a range of 160 and 180° C. without discolorization, in general, they decompose at 202° C. to less than 1% by weight per minute and have a reduced viscosity within the range of 0.3 and 3, and preferably within the range of 0.5 and 2, ascertained in a 0.5% solution in butyrolactone at 140° C. in the presence of 2% by weight of diphenylamine.

In view of the high toughness, hardness and thermostability, the polyacetals prepared by the process of the invention are suitable for a great variety of fields of application.

They can be processed by the methods applied in the plastics industry to form foils, plates, blocks, tubes, threads or any desired die cast parts.

The following examples serve to illustrate the invention, but they are not intended to limit it thereto, the parts being by weight:

Example 1

0.004 mol percent of gaseous boron trifluoride (calculated on the trioxane used) was introduced into 100 parts of molten trioxane which was intimately stirred in a nitrogen atmosphere and kept at a temperature of 62° C. After a short time, polymerization set in and was recognized by a turbidity produced in the previously clear melt. The batch solidified pari passu with the progress of the polymerization and a solid block of the polymer was formed.

The block was comminuted and finely ground before being worked up. The powder thus obtained and methanol were boiled for 1 hour under reflux, while adding about 2 percent by volume of ethanolamine, calculated on the methanol, then filtered with suction, repeatedly washed with methanol and dried at 60° C. under reduced pressure.

For the stabilization of the terminal groups, the polymer was dissolved at a temperature within the range of 150 and 160° C. in a pressure vessel in 10 times its quantity of acetic anhydride to which had been added a small amount of potassium acetate as catalyst; the whole was kept for 20 minutes in the dissolved state and then reprecipitated by cooling the solution. The product was carefully washed with acetone and then with water whereupon it was dried for 24 hours at 70° C. under reduced pressure. For a further stabilization it was mixed with 1% of finely pulverized urea, based on the weight of the polymer.

The thermal decomposition of the stabilized polymer amounted at 222° C. to 0.24% by weight per minute.

The reduced viscosity was determined at 140° C. in a 0.5% solution in j-butyrolactone to which 2% by weight of diphenylamine had been added as stabilizer. It amounted to 1.05.

The polymer was processed by injection moulding or extrusion and there were obtained cups, dishes, combs, tubes and the like. At an operating temperature ranging between 190 and 200° C. and under a pressure of 100 kilograms per square centimeter it could be pressed to form very tough, elastic films and foils.

Example 2

0.002 mol percent of gaseous boron trifluoride, calculated on the trioxane used, was introduced into 100 parts of molten trioxane which was vigorously stirred in a nitrogen atmosphere and maintained at a temperature of 70° C. Polymerization set in within a short time. The resulting block of the polymer was comminuted and processed in the manner described in Example 1.

The product obtained was stabilized by suspending it in a solution of 1 percent by weight, calculated on the quantity of the polymer, of urea in methanol. The mixture was heated to boiling for 30 minutes under reflux, the solvent was evaporated and the product was dried at 50° C. under reduced pressure.

The thermal decomposition at 202° C. amounted to 0.3% by weight per minute.

Example 3

0.008 mol percent of gaseous boron trifluoride, calculated on the trioxane used, and 5 parts of glass powder as filler were introduced into 100 parts of molten trioxane which was intimately stirred in a nitrogen atmosphere and maintained at a temperature of 70° C. Polymerization set in after 2 minutes. Within a short time a solid block of the polymer was formed which was comminuted and processed in the manner described in Example 1.

The polymer obtained as a white powder showed, at 202° C., a thermal decomposition of 0.5 percent by weight per minute.

Example 4

0.004 mol percent of boron trifluoride—calculated on the trioxane used—and diluted with nitrogen to four times its volume, was introduced into 1000 parts of molten trioxane which was intimately stirred in a nitrogen atmosphere and maintained at a temperature of 62° C. By the polymerization which set in after a short time, a solid block of the polymer was formed which was comminuted and worked up as described in Example 1.

The polymer obtained in the form of a powder was stabilized by mixing it with 1 percent by weight of finely pulverized urea. It then showed a thermal decomposition of 0.28 percent by weight per minute at 202° C.

Example 5

2 parts of polyacetal—prepared by block polymerization of trioxane by the process of the invention—and containing 0.006 part of boron trifluoride bound in an adsorptive form, were introduced into 200 parts of molten trioxane which was stirred in a nitrogen atmosphere and maintained at a temperature of 65° C. After a short time polymerization set in and a solid block of the polymer was formed which was comminuted and further processed as described in Example 1.

The polymer which had been processed and dried was stabilized by admixing 0.5 percent by weight of urea, whereupon the thermal decomposition amounted to 0.32 percent by weight per minute at 202° C.

The reduced viscosity was determined in butyrolactone under the conditions described in Example 1 and was found to be 0.84.

Example 6

0.03 part of tin (IV) chloride—corresponding to 0.007 mol percent, calculated on the trioxane used, was introduced into 150 parts of molten trioxane which was intimately stirred in a nitrogen atmosphere and maintained at a temperature of 65° C. The polymerization soon set in and in a rapid reaction a solid block of the polymer was formed, which was comminuted and worked up in the manner described in Example 1.

The white powder of the polymer thus obtained was stabilized by the addition of 1 percent by weight of urea. There was then observed a thermal decomposition of 0.45 percent by weight per minute at 202° C.

Example 7

0.02 part of antimony (V) chloride—corresponding to 0.006 mol percent, calculated on the trioxane used—was introduced into 100 parts of molten trioxane which was intimately stirred in a nitrogen atmosphere and maintained at 65° C. Polymerization set in at once and a solid block of the polymer was formed within a short time. The block was comminuted and processed as described in Example 1.

The product obtained was stabilized by adding 1 percent by weight of urea. A thermal decomposition of 0.5 percent by weight per minute at 202° C. was then observed. The reduced viscosity determined in butyrolactone under the conditions described in Example 1 amounted to 0.73.

Example 8

0.01 part of anhydrous, sublimed ferric chloride, corresponding to 0.006 mol percent, calculated on the trioxane used, was introduced into 300 parts of molten trioxane which was stirred in a nitrogen atmosphere and maintained at a temperature of 70° C. The catalyst dissolved at once. Polymerization set in after about 2 minutes and within a short time a solid block of the polymer was formed which was comminuted and worked up as described in Example 1.

The polymer obtained as a powder was suspended in a solution of 1 percent by weight, calculated on the quantity of the polymer, of urea in methanol, and the mixture was heated to boiling for 30 minutes under reflux. The solvent was then evaporated and the product was dried at 50° C. under reduced pressure.

The thermal decomposition at 202° C. amounted to 0.61 percent by weight per minute.

Example 9

0.014 part of an addition product of boron trifluoride and diethyl ether—corresponding to 0.004 mol percent, calculated on the quantity of trioxane used, was introduced into 200 parts of molten trioxane which was stirred in an atmosphere of nitrogen and maintained at a temperature of 65° C. Polymerization set in at once and within a short time a solid block of the polymer was formed which was comminuted and further processed as described in Example 1.

The pulverulent polymer obtained was stabilized by the addition of 3 percent by weight of urea, calculated on the proportion of polymer, dissolved at 150° C. in dimethyl-formamide and maintained for 10 minutes in the dissolved state. The polymer which recrystallized after cooling was filtered off with suction, repeatedly washed with methanol and dried for 48 hours at 70° C. under reduced pressure.

A thermal decomposition of 0.4 percent by weight per minute at a temperature of 202° C. was observed. The viscosity determined in butyrolactone under the conditions described in Example 1 amounted to 1.1.

Example 10

0.015 part of an addition product of boron trifluoride and tetrahydrofurane-etherate—corresponding to 0.003 mol percent, calculated on the trioxane used—was introduced into 300 parts of molten trioxane which was stirred in a nitrogen atmosphere and maintained at 62° C. Polymerization set in immediately and within a short time a solid block of the polymer was formed which was comminuted and processed as described in Example 1.

The polymer worked up was obtained in the form of a white powder in a yield of 89%, calculated on the trioxane applied. A thermal decomposition of 0.38% by weight was observed per minute at a temperature of 202° C.

Example 11

0.005 part of an addition product of tin (IV) chloride and diethyl ether, corresponding to 0.001 mol percent, calculated on the trioxane used, was introduced into 100 parts of molten trioxane which was stirred in a nitrogen atmosphere and maintained at a temperature of 65° C. Polymerization set in after a few minutes and a solid block of the polymer was formed which was comminuted and worked up as described in Example 1.

The polymer obtained was stabilized by mixing it with 1 percent by weight of urea, calculated on the quantity of the polymer. The thermal decomposition amounted to 0.58 percent by weight per minute at 202° C.

Example 12

0.005 part of the complex compound of boron trifluoride and diphenylamine, corresponding to 0.002 mol percent, calculated on the quantity of trioxane used, was introduced into 100 parts of molten trioxane which was kept in a nitrogen atmosphere at a temperature of 65° C. The mixture was dissolved by stirring it for a short time. Polymerization set in after 5 minutes, and in the course of a further 5 minutes a solid block of the polymer was formed which was comminuted and processed as described in Example 1.

The white polymer obtained in a yield of 87%, calculated on the trioxane used, showed a thermal decomposition of 0.41 percent by weight per minute at 202° C. The viscosity determined in butyrolactone under the conditions mentioned in Example 1 amounted to 0.84.

Example 13

0.01 part of triethyl-oxonium-fluoborate, corresponding to 0.005 mol percent, calculated on the quantity of trioxane used, was dissolved in 100 parts of molten trioxane which was maintained at a temperature of 65° C. in a nitrogen atmosphere. Polymerization set in after 4 minutes and a solid block of the polymer was formed in about the same time. The block was comminuted and further treated as described in Example 1.

The polymer obtained in the form of a white powder was stabilized by mixing it with 1 percent by weight of urea, calculated on the quantity of the polymer. It then showed a thermal decomposition of 0.29 percent by weight per minute at 202° C.

The reduced viscosity determined in butyrolactone under the conditions described in Example 1 amounted to 0.93.

Example 14

0.025 part of triethyl-oxonium-tetrachlor-ferriate, corresponding to 0.0015 mol percent, calculated on the trioxane used, was dissolved in 500 parts of molten trioxane which was maintained at a temperature of 65° C. in a nitrogen atmosphere. Polymerization set in after 6 minutes, and in the course of 15 minutes a solid block of the polymer was formed which was comminuted and processed as described in Example 1.

The polymer obtained was stabilized by mixing it with 1.5 percent by weight of urea, calculated on the quantity of the polymer. At 202°C. it showed a thermal decomposition of 0.38 per cent by weight per minute.

Example 15

0.02 part of bis-(tri-ethyl-oxonium)-hexachlorostanniate, corresponding to 0.0034 mol percent, calculated on the trioxane used, is dissolved in 100 parts of molten trioxane which is maintained at a temperature of 68° C. in a nitrogen atmosphere. Polymerization sets in after a short time and a solid block of the polymer was formed which was comminuted and further treated as described in Example 1.

The polymer obtained was stabilized by mixing it with 1.5 percent by weight of urea, calculated on the quantity of the polymer. It then showed a thermal decomposition of 0.28 percent by weight per minute at 202° C.

Example 16

0.015 part of tri-ethyl-oxonium-hexachloro-antimoniate, corresponding to 0.003 mol percent, calculated on the trioxane used, was dissolved in 100 parts of molten trioxane which was maintained at a temperature of 62° C. in a nitrogen atmosphere. Polymerization set in after a few minutes and a solid block of the polymer was formed which was comminuted and worked up as described in Example 1.

The polymer obtained was stabilized by mixing it with 1.5 percent by weight of urea, calculated on the quantity of the polymer. It then showed a thermal decomposition of 0.26 percent by weight per minute at 202° C.

Example 17

0.01 part of 2-carbmethoxy-phenyldiazonium-fluoborate, corresponding to 0.0036 mol percent, calculated on the trioxane used, was dissolved in 100 parts of molten trioxane which was maintained at 65° C. in a nitrogen atmosphere. Polymerization set in after 5 minutes, and after a short time a solid block of the polymer was formed which was comminuted and worked up as described in Example 1.

The polymer was obtained as a white powder in a yield of 91 per cent, calculated on the trioxane used. It was stabilized by mixing it with 1 per cent by weight of urea, calculated on the quantity of the polymer and it then showed a thermal decomposition of 0.16 percent by weight per minute at a temperature of 202° C.

The reduced viscosity determined in butyrolactone under the conditions mentioned in Example 1 amounted to 0.76.

Example 18

0.045 part of 3-carbmethoxy-phenyldiazonium-fluoroborate corresponding to 0.0054 mol percent, calculated on the trioxane used, was dissolved in 300 parts of molten trioxane which was kept at a temperature of 62° C. in a nitrogen atmosphere. Polymerization set in after a few minutes and a solid block of the polymer was formed which was comminuted and processed as described in Example 1.

The yield amounted to 84 percent, calculated on the trioxane used. The white, pulverulent polymer obtained was stabilized by mixing it with 1 percent by weight of urea, calculated on the quantity of the polymer. It then showed a thermal decomposition of 0.17 percent by weight per minute at a temperature of 202° C.

The reduced viscosity determined in butyrolactone under the conditions given in Example 1 was 0.60.

Example 19

0.015 part of 3-nitro-phenyl-diazonium-fluoroborate corresponding to 0.0038 mol percent, calculated on the trioxane used, was dissolved in 150 parts of molten trioxane which was maintained at a temperature of 68° C. in a nitrogen atmosphere. Polymerization set in after a short time, and a solid block of the polymer was formed which was comminuted and worked up as described in Example 1.

The yield amounted to 80 percent, calculated on the trioxane used. The white, pulverulent polymer obtained showed a thermal decomposition of 0.4 percent by weight per minute at 202° C.

The reduced viscosity determined in butyrolactone under the conditions described in Example 1 amounted to 0.63.

Example 20

0.005 part of 4-nitro-phenyldiazonium-fluoborate, corresponding to 0.0019 mol percent, calculated on the trioxane used, was dissolved in 100 parts of molten trioxane which was maintained at 65° C. in a nitrogen atmosphere. Polymerization set in after 3 minutes, and in the course of a further 4 minutes a solid block of the polymer was formed which was comminuted and further treated as described in Example 1.

The terminal groups were stabilized; for that purpose the white polymer obtained in yield of 92% was esterified with acetic anhydride in the manner described in Example 1. For the further thermo-stabilization it was mixed with 1 percent by weight of urea, calculated on the amount of polymer esterified. It then showed a thermal decomposition of 0.09 percent by weight per minute at 222° C.

The reduced viscosity determined by butyrolactone under the conditions described in Example 1 amounted to 1.16.

At operating temperatures ranging between 190 and 200° C. the polymer could be pressed by the die-casting and extrusion processes to a great variety of shaped articles and, with application of a pressure of 100 kilograms per square centimeter to very tough, elastic films or foils.

Example 21

0.015 part of 2-methyl-4-nitro-phenyl-diazonium-fluoborate, corresponding to 0.0054 mol percent, calculated on the trioxane used, was dissolved in 100 parts of molten trioxane which was maintained at a temperature of 70° C. in a nitrogen atmosphere. Polymerization set in after a short time and a solid block of the polymer was formed which was comminuted and further processed as described in Example 1.

The yield amounted to 75%, calculated on the quantity of trioxane used. The polymer obtained showed a thermal decomposition of 0.17 percent by weight per minute at 202° C.

Example 22

0.01 part of 2-chloro-phenyl-diazonium-fluoborate, corresponding to 0.004 mol percent, calculated on the trioxane used, was dissolved in 100 parts of molten trioxane which was maintained at 90° C. in a nitrogen atmosphere. Polymerization set in after 7 minutes, and in the course of a further 15 minutes a solid block of the polymer was formed which was comminuted and worked up in the manner described in Example 1.

The white polymer obtained was stabilized by mixing it with 1 percent by weight of urea, calculated on the quantity of polymer. It then showed a thermal decomposition of 0.09 percent by weight per minute at 202° C.

The reduced viscosity determined in butyrolactone under the conditions given in Example 1 was 0.84.

Example 23

0.045 part of 3-chloro-phenyl-diazonium-fluoborate, corresponding to 0.006 mol percent, calculated on the trioxane used, was dissolved in 300 parts of molten trioxane which was maintained at a temperature of 62° C. under a nitrogen atmosphere. Polymerization set in after 5 minutes and after a short time a solid block of the polymer was formed which was comminuted and worked up as described in Example 1.

The terminal groups were stabilized by esterifying the white polymer obtained with acetic anhydride, as described in Example 1. The thermal decomposition was then 0.26 percent by weight per minute at 222° C.

Example 24

0.037 part of 2-chloro-5-trifluoromethyl-phenyl-diazonium-fluoborate was dissolved in 250 parts of molten trioxane which was maintained at 75° C. in a nitrogen atmosphere. At the beginning of the polymerization which was recognized by a turbidity of the previously clear melt, 50 parts of solid trioxane were added which melted in the course of the polymerization and then likewise polymerized. The block of polymer formed after a short time was comminuted and processed as described in Example 1.

The polymer obtained was stabilized by mixing it with 1 percent by weight of urea, calculated on the proportion of polymer. It then showed a thermal decomposition of 0.08 percent by weight per minute at 202° C.

At a temperature ranging between 190 and 200° C. and under a pressure of 120 kilograms per square centimeter the polymer could be molded so as to form tough, elastic foils.

Example 25

0.008 part of 2-ethyl-sulphonyl-5-trifluoromethyl-phenyl-diazonium-fluoborate, corresponding to 0.002 mol percent, calculated on the trioxane used, was dissolved in 100 parts of molten trioxane which was maintained at a temperature of 110° C. in a nitrogen atmosphere. Polymerization rapidly set in and a solid block of the polymer was formed which was comminuted and worked up as described in Example 1.

The polymer obtained showed a thermal decomposition of 0.2 percent by weight per minute at 202° C.

The reduced viscosity determined in butyrolactone under the conditions described in Example 1 amounted to 0.68.

Example 26

0.06 part of 2-methoxy-5-sulphondiethyl-amino-fluoborate, corresponding to 0.013 mol percent, calculated on the trioxane applied, was dissolved in 500 parts of molten trioxane which was maintained at a temperature of 65° C. in a nitrogen atmosphere. Polymerization set in after 3 minutes. After a further 5 minutes a solid block of the polymer was formed which was comminuted and finely ground.

The terminal groups were stabilized by esterifying the crude polymer with acetic anhydride as described in Example 1. For a further thermo-stabilization the esterified product was mixed with 0.5 percent by weight of urea, calculated on the quantity of the polymer. It then showed a thermal decomposition of 0.15 percent by weight per minute at 222° C.

The reduced viscosity determined in butyrolactone under the conditions described in Example 1 amounted to 0.99.

Example 27

0.007 part of 2:5-dimethoxy-4-nitrilo-phenyl-diazonium-fluoborate, corresponding to 0.0025 mol percent, calculated on the trioxane used, was dissolved in 100 parts of molten trioxane which was maintained at a temperature of 62° C. in a nitrogen atmosphere. Polymerization set in rapidly and a solid block of the polymer was formed which was comminuted and worked up in the manner described in Example 1.

The polymer obtained showed a thermal decomposition of 0.29 percent by weight per minute at 202° C.

The reduced viscosity determined in butyrolactone under the conditions mentioned in Example 1 amounted to 1.51.

Example 28

0.02 part of 4-diphenyl-diazonium-fluoborate-corresponding to 0.0017 mol percent, calculated on the trioxane used—was dissolved in 400 parts of molten trioxane which was maintained at a temperature of 65° C. in a nitrogen atmosphere. Polymerization set in after 3 minutes. After a further 7 minutes a solid block of the polymer was formed which was comminuted and processed as described in Example 1. The polymer obtained showed a thermal decomposition of 0.25 percent by weight per minute at 202° C. The terminal groups were stabilized by esterifying the polymer with acetic anhydride, as was described in Example 1. For a further thermo-stabilization the esterified product was mixed with 0.7% by weight of urea, calculated on the quantity of the polymer. The stabilized polymer showed a thermal decomposition of 0.13 percent by weight per minute at 222° C.

The reduced viscosity determined in butyrolactone under the conditions mentioned in Example 1 was at 0.89.

The polymer could be processed at operating temperatures ranging between 190 and 200° C. and a great variety of moulded articles as well as elastic, very tough films and foils were obtained.

Example 29

0.007 part of 2-methyl-4-cyclohexyl-phenyl-diazonium-fluoborate, corresponding to 0.0022 mol percent, calculated on the trioxane used, was dissolved in 100 parts of molten trioxane which was maintained at 70° C. in a nitrogen atmosphere. Polymerization set in after 6 minutes and a solid block of the polymer was formed which was comminuted and processed in the manner described in Example 1. The polymer obtained was stabilized by mixing it with 1 percent by weight of urea, calculated on the quantity of the polymer. The thermal decomposition then amounted to 0.1 percent by weight per minute at a temperature of 202° C.

The reduced viscosity measured under the conditions given in Example 1 was at 1.36.

Example 30

0.026 part of 2:6-dimethoxy-4-phenoxy-phenyl-diazonium-fluoborate, corresponding to 0.0034 mol percent, calculated on the trioxane used, was dissolved in 200 parts of molten trioxane which was contained in a bag made of polyethylene and was maintained at a temperature at 62° C. in a nitrogen atmosphere. Polymerization set in rapidly and a solid block of the polymer was formed. The polyethylene film was removed from the block formed, whereupon the block was comminuted and processed under the conditions described in Example 1.

The white pulverulent polymer obtained in a yield of 88% showed a thermal decomposition of 0.31 percent by weight per minute at 202° C.

Example 31

0.024 part of 2-methyl-4-(2'-methyl-phenylazo)-phenyl-diazonium-fluoborate was dissolved in 200 parts of molten trioxane and the mixture was added, while vigorously stirring, to 500 parts of pulverized polyacetal, prepared by block polymerization of trioxane according to the process of the invention, and maintained at a temperature of 65° C. in a nitrogen atmosphere in a reaction vessel which was equipped with a firm stirring means. The reaction mass which first had a tendency for the formation of lumps disintegrated more and more pari passu with the progress of the polymerization. When the reaction was complete, the polymer was obtained in the form of a fine, white powder, which was worked up as described in Example 1, a further grinding operation having not been necessary.

The polymer obtained was stabilized by mixing it with 1 percent by weight of urea calculated on the quantity of polymer. It then showed a thermal decomposition of 0.28 percent by weight per minute at 202° C.

Example 32

0.004 part of 2-chloro-4-(4'-nitrophenylazo)-phenyl-diazonium-fluoborate, corresponding to 0.00095 mol perment, calculated on the trioxane used, was dissolved in 100 parts of molten trioxane which was maintained at a temperature of 100° C. in a nitrogen atmosphere. Polymerization set in rapidly and a solid block of the polymer was formed which was comminuted and worked up as described in Example 1.

The terminal groups were stabilized by esterifying the polymer obtained with acetic anhydride as was described in Example 1. For a further thermo-stabilization the esterified polymer was mixed with 1 percent by weight of urea, calculated on the quantity of the polymer. It then showed a thermal decomposition of 0.12 percent by weight per minute at 222° C.

The polymer was processed and various shaped articles were thus obtained. At a temperature ranging between 190 and 200° C. and under a pressure of 150 kilograms per square centimeter, tough flexible films and foils were obtained from the polymer.

*Example 33*

0.006 part of 1-anthraquinonyl-diazonium-fluoborate, corresponding to 0.0017 mol percent, calculated on the trioxane used, was dissolved in 100 parts of molten trioxane which was maintained at 85° C. in a nitrogen atmosphere. Polymerization set in after 6 minutes and a solid block of the polymer was formed which was comminuted and worked up as described in Example 1.

The polymer obtained showed a thermal decomposition of 0.23 percent by weight per minute at a temperature of 202° C.

The reduced viscosity determined in butyrolactone under the conditions given in Example 1 was at 0.79.

*Example 34*

0.008 part of 1-fluorenyl-diazonium-fluoborate, corresponding to 0.0026 mol percent, calculated on the trioxane used, was dissolved in 100 parts of molten trioxane which was maintained at 72° C. in a nitrogen atmosphere. Polymerization rapidly set in and a solid block of the polymer was formed which was comminuted and further treated as described in Example 1.

The polymer obtained was stabilized by mixing it with 1.5 percent by weight of urea, calculated on the proportion of the polymer. It then showed a thermal decomposition of 0.11 percent by weight per minute at a temperature of 202° C.

The reduced viscosity determined in butyrolactone under the conditions given in Example 1 was at 1.24.

*Example 35*

0.007 part of 2:5-dimethoxy-4-benzoylamino-phenyl-diazonium-fluoborate, corresponding to 0.0017 mol percent, calculated on the trioxane used, was dissolved in 100 parts of molten trioxane which was maintained at 62° C. in a nitrogen atmosphere. The batch was kept for 1 hour at 62° C. in the dark; any alteration was not observed thereby. The mixture was then exposed to the rays of an infrared lamp. Polymerization set in after 5 minutes and after a short time a solid block of the polymer was formed which was comminuted and worked up as described in Example 1.

In order to stabilize the terminal groups, the polymer obtained was esterified with acetic anhydride as described in Example 1. For a further thermo-stabilization it was mixed with 1 percent by weight of urea, calculated on the quantity of polymer. The thermal decomposition then amounted to 0.2 percent by weight per minute at 222° C.

The reduced viscosity determined in butyrolactone under the conditions described in Example 1 was at 0.72.

*Example 36*

0.012 part of 2:6-diethoxy-4-(4'-methylphenylthio)-phenyldiazonium-fluoborate, corresponding to 0.0027 mol percent, calculated on the trioxane used, was dissolved in 100 parts of molten trioxane which was maintained at 62° C. in a nitrogen atmosphere. The batch was kept for 1 hour at 62° C. in the dark. An alteration did not occur. The mixture was then exposed to the rays of an infrared lamp. Polymerization set in after 5 minutes and a solid block of the polymer was rapidly formed which was comminuted and worked up as described in Example 1.

The polymer obtained was stabilized by mixing it with 1 percent by weight of urea. It then showed a thermal decomposition of 0.23 percent by weight per minute at 202° C.

*Example 37*

A mixture of 1 part of polyacetal (prepared by the block polymerization of trioxane by the process of the present invention) and 0.01 part of 4-nitro-phenyl-diazonium-fluoborate was added to 100 parts of molten trioxane which was stirred in a nitrogen atmosphere and maintained at 65° C. After 5 minutes polymerization set in. In the course of a further 8 minutes a solid block of the polymer was formed which was comminuted and further treated as described in Example 1.

The yield amounts to 89 percent, calculated on the trioxane used. The white polymer obtained showed a thermal decomposition of 0.15 percent by weight per minute at 202° C.

The reduced viscosity determined in butyrolactone under the conditions described in Example 1 amounted to 0.72.

*Example 38*

0.015 part of 4-nitrophenyl-diazonium-hexafluophosphate corresponding to 0.005 mol percent—calculated on the trioxane used, was dissolved in 100 parts of molten trioxane which was maintained at 75° C. in a nitrogen atmosphere. Polymerization set in after 10 minutes and a solid block of the polymer was formed which was comminuted and worked up as described in Example 1.

The pulverulent polymer obtained was stabilized by mixing it with 1.2 percent by weight of urea, calculated on the quantity of the polymer applied, whereupon it showed a thermal decomposition of 0.31 percent by weight per minute at 202° C.

*Example 39*

0.8 part of triethyl-aluminum and 2.5 parts of n-butyl-chloromethyl-ether were dissolved in 100 parts of molten trioxane which was maintained at 62° C. in a nitrogen atmosphere. Polymerization set in after 15 minutes and in the course of several hours a solid block of the polymer was formed which was comminuted and further treated as described in Example 1.

The polymer obtained was stabilized by mixing it with 1.5 percent by weight of urea, calculated on the quantity of the polymer. It then had a thermal decomposition of 0.39 percent by weight per minute at 202° C.

*Example 40*

10 parts of molten trioxane are combined at 62° C., while vigorously stirring, with exclusion of moisture and air, with 0.07 part of methyl-aluminum-dichloride. Polymerization set in after a few minutes. In the course of the polymerization the molten monomer becomes turbid and finally solidifies to form a solid block of the polymer.

The further treatment is the same as that described in Example 1. The dried polymer is then mixed with 1.5 percent by weight of urea, calculated on the quantity of the polymer. The thermal decomposition of the product thus obtained was 0.34 percent by weight per minute at 202° C.

For a comparative valuation of the results attained by the polymerization, trioxane was polymerized by a known method in the presence of antimony(III)fluoride.

The results of these tests are given in the following table:

| Parts by weight trioxane | Parts by weight SbF$_3$ | Polymerization temperature, °C. | Period of polymerization | Loss by weight per minute at 202° C., percent |
|---|---|---|---|---|
| 100 | 0.1 | 125 | 72ʰ | 2.2 |
| 100 | 1.0 | 130 | 24ʰ | 2.4 |
| 100 | 2.0 | 85 | 120ʰ | 2.6 |

*Behavior during melting at 202° C.*—No clear melt, the infusible portion increasing pari passu with the increase of the content of catalyst.

*Evaluation of the polymerization results.*—The polymerization of trioxane at a temperature of >116° C. can be industrially controlled only with difficulty owing to the high sublimation of the monomer.

The catalyst is insoluble in the monomer so that a uniform distribution of $SbF_3$ in the monomer and connected therewith, a uniform course of the polymerization are not possible.

The activity of the catalysts is inferior to that of the catalysts claimed by the process of the present invention.

As regards the yield per unit of volume and time the known process is likewise inferior to the process of the invention.

The thermo-stability of the polymers obtained in the presence of $SbF_3$ is inferior by one order of magnitude to that of the polymers obtained by the processes described in Examples 3, 10, 12, 19, 21, 25, 27, 28, 30, 33 and 37.

The melting behavior at 202° C. of the polymers prepared in the presence of $SbF_3$ is different from that of the polymers prepared by the process of the present invention.

The polymers prepared in the presence of $SbF_3$ melt only partially and with discoloration pari passu with the increase of the content of the catalyst, whereas the polymers obtained by the process of the invention are very rapidly converted at 202° C. into a limpid, colorless melt. The advantages resulting thereby with regard to an industrial processing need not be discussed herein in detail.

The same or similar conditions are observed when dissolving the polymers. The polymers prepared in the presence of $SbF_3$ yield a more or less strongly turbid solution, whereas the solutions in butyrolactone of the polymers prepared by the process of the invention are colorless and limpid at a temperature ranging between 140 and 150° C.

In view of the small quantity of catalyst required, which, moreover, is soluble in the monomer, furthermore, in view of the high yields per unit of volume and time, the excellent thermo-stability, the favorable distribution of the molecular weight and the good processability, the polymers obtained by the process of the invention are far superior to all the polymers hitherto prepared by other methods from trioxane.

By the use of thermo-active and/or light-active catalysts as carriers, in the form of the oxonium salts or diazonium salts described herein, new possibilities are, moreover, opened for the industrial polymerization of cyclic acetals, and more particularly new possibilities for the polymerization of trioxane.

We claim:

1. A process for the manufacture of linear polymers of trioxane of high molecular weight which comprises the step of polymerizing trioxane by mass polymerization at a temperature within the range of about 0° C. to about 150° C. in admixture with a cationic-active catalyst selected from the group consisting of
   (1) 0.0001 to 0.1 mol percent, calculated upon the trioxane, of an oxonium salt complex of boron, antimony, iron, tin and phosphorus chlorides and fluorides;
   (2) 0.0001 to 0.1 mol percent, calculated upon the trioxane, of an aryldiazonium salt complex of boron, antimony, iron, tin and phosphorus chlorides and fluorides;
   (3) 0.01 to 1 percent, calculated upon the weight of trioxane, of an organic metal compound of a metal selected from the group consisting of B, Al and Sn, and 0.01 to 5 percent, calculated upon the weight of trioxane, of an α-halogen ether of the formula

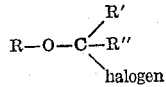

wherein R represents a member selected from the group consisting of saturated alkyl and cycloalkyl groups, and R′ and R″ represent members of the group consisting of hydrogen, saturated alkyl and cycloalkyl groups.

2. The process of claim 1, wherein 0.001 to 0.05 mol percent of said oxonium and diazonium salts are used.

3. The process of claim 1, wherein the polymerization temperature is within the range of 50° C. to 90° C.

4. The process of claim 1 wherein said oxonium salt is used.

5. The process of claim 1 wherein said aryldiazonium salt is used.

6. The process of claim 1 wherein said aryldiazonium salt is a light-active aryldiazonium salt.

7. The process of claim 1 wherein said aryldiazonium salt is a thermo-active aryldiazonium salt.

8. The process of claim 1 wherein said aryldiazonium salt is a light-active aryldiazonium fluoroborate.

9. The process of claim 1 wherein said aryldiazonium salt is a thermo-active aryldiazonium fluoroborate.

10. A process for the manufacture of linear polymers of trioxane of high molecular weight which comprises the step of polymerizing trioxane at a temperature within the range of 0° C. to 150° C. in admixture with a cationic catalyst consisting of 0.01 to 1 percent, calculated upon the weight of trioxane, or an organic metal compound of a metal selected from the group consisting of B, Al and Sn, and 0.01 to 5 percent, calculated upon the weight of trioxane, of an α-halogen ether of the formula

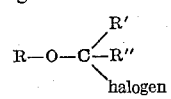

wherein R represents a member selected from the group consisting of saturated alkyl and cycloalkyl groups, and R′ and R″ represent members of the group consisting of hydrogen, saturated alkyl and cycloalkyl groups.

References Cited by the Examiner

UNITED STATES PATENTS

| | | | |
|---|---|---|---|
| 2,795,571 | 6/1957 | Schneider | 260—67 |
| 2,936,298 | 5/1960 | Hudgin et al. | 260—67 |
| 2,947,728 | 8/1960 | Bartz | 260—67 |
| 2,989,509 | 6/1961 | Hudgin et al. | 260—67 |
| 2,989,511 | 6/1961 | Schnizer | 260—67 |
| 3,030,338 | 4/1962 | Aries | 260—67 |

FOREIGN PATENTS 1,216,327  11/1959  France.

OTHER REFERENCES

Meerwein et al., Ann. 566, 150–162 (1950) Copy in Scientific Library QD 1L7.

WILLIAM H. SHORT, *Primary Examiner.*

JOSEPH L. SCHOFER, *Examiner.*

H. N. BURSTEIN, M. STERMAN, LOUISE P. QUAST, J. R. LIBERMAN, R. J. BUTTERMARK, L. M. MILLER, L. M. PHYNES, *Assistant Examiners.*